(12) United States Patent
Jasurda

(10) Patent No.: US 9,586,707 B1
(45) Date of Patent: *Mar. 7, 2017

(54) SEALING PACKAGES USING TAPE AND PULL CORD

(71) Applicant: Pack Pros-R-Us, LLC, Colby, WI (US)

(72) Inventor: David P. Jasurda, Loyal, WI (US)

(73) Assignee: Pack Pros-R-Us, LLC, Colby, WI (US)

( * ) Notice: Subject to any disclaimer, the term of this patent is extended or adjusted under 35 U.S.C. 154(b) by 48 days.

This patent is subject to a terminal disclaimer.

(21) Appl. No.: 14/578,706

(22) Filed: Dec. 22, 2014

Related U.S. Application Data

(63) Continuation of application No. 13/734,305, filed on Jan. 4, 2013.

(51) Int. Cl.
| | |
|---|---|
| *B31B 19/90* | (2006.01) |
| *B65B 1/06* | (2006.01) |
| *B65B 7/16* | (2006.01) |
| *B65B 61/06* | (2006.01) |
| *B65H 35/00* | (2006.01) |

(52) U.S. Cl.
CPC ............ *B65B 7/162* (2013.01); *B31B 19/90* (2013.01); *B65B 61/06* (2013.01); *B65H 35/004* (2013.01)

(58) Field of Classification Search
CPC ... B65B 7/162; B65B 61/06; Y10T 156/1052; Y10T 156/1062; B65H 35/004
See application file for complete search history.

(56) References Cited

U.S. PATENT DOCUMENTS

| | | |
|---|---|---|
| 3,199,262 A | 8/1965 | Miller et al. |
| 4,640,731 A | 2/1987 | Lerner et al. |
| 5,081,817 A | 1/1992 | Nesbitt |
| 6,159,328 A | 12/2000 | Gaikoski et al. |

*Primary Examiner* — Mark A Osele
*Assistant Examiner* — Christopher C Caillouet
(74) *Attorney, Agent, or Firm* — Craig A. Fieschko, Esq.; DeWitt Ross & Stevens S.C.

(57) ABSTRACT

An exemplary package-sealing method and system involves sealing a package with adhesive tape such that a pull cord is sandwiched between the tape and the package. A tape head includes a roll of tape and a pull cord spool, and a collar guide that helps position the pull cord between the tape's sides. Forward and rear applying rollers press leading and trailing edges of the tape, respectively, against the package being sealed. A tape blade and a pull cord blade secured to a cutting arm sever the pull cord before severing the tape, leaving a pull tab that extends out from beneath the tape when the package is sealed. The pull tab allows a user to conveniently unseal the package by grasping the pull cord and pulling thereon to separate the tape from the package without using sharp objects, enhancing user safety and reducing accidental damage to packages.

20 Claims, 6 Drawing Sheets

SEALING PACKAGES USING TAPE AND PULL CORD

CROSS-REFERENCE TO RELATED APPLICATIONS

This application is a continuation of U.S. patent application Ser. No. 13/734,305 filed Jan. 4, 2013, which is incorporated by reference herein.

FIELD OF THE INVENTION

This document concerns an invention relating generally to sealing packages using a tape and a pull cord.

BACKGROUND OF THE INVENTION

Packages like cardboard boxes sealed with tape are generally difficult to open with one's bare hands. Often a knife or other sharp object is used to cut the tape or otherwise access the inside of the package. Using knives and other sharp objects can result in personal injury and can damage the contents of the package, both of which can be costly. Prior attempts in the case-sealing industry at making easy-open packages have included folding a portion of the tape onto itself along an edge of the tape, leaving a folded strip extending the length of the tape. Because the folded strip of the tape is not sealed to the package, the tape can be pulled off by other packages stacked on top of the package (in, e.g., a production setting). Also, the folded strip can be difficult to grasp by the user. What is needed is a method for conveniently and safely opening sealed packages without the need for knives or other sharp objects.

SUMMARY OF THE INVENTION

The invention, which is defined by the claims set forth at the end of this document, is directed to methods and systems that at least partially alleviate the aforementioned (and other) problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring initially to FIGS. 1 and 5A-5C, an exemplary package sealing method and system involves sealing packages 10 using adhesive tape 20, with a pull cord 30 sandwiched between the tape 20 and sealed packages 10. A tape head 40, which can be installed in a carton sealer 50, can receive a roll of tape 60 and a pull cord spool 70. A collar guide 80 (FIG. 3) supports the pull cord 30 on its path from the pull cord spool 70 to the tape 20, and helps position the pull cord 30 preferably about midway between the sides of tape 20 (FIG. 6). A tape blade 90 and a pull cord blade 100 are secured to a blade adapter 110 (FIGS. 4A-4C), which is secured to a cutting arm 120 of the tape head 40 (FIG. 7). When a package 10 encounters the tape head 40, a forward applying roller 130 presses a leading end 140 of the tape 20 against the package 10 being sealed (FIG. 5A). The tape blade 90 and pull cord blade 100 sever the tape 20 and the pull cord 30 at a trailing end 150 of the tape 20 (FIG. 5B). A rear applying roller 160 presses the trailing end 150 of the tape 20 against the package 10, sealing the package 10 with the tape 20 and pull cord 30 (FIG. 5C). The pull cord 30 is severed before the tape 20 is severed, leaving a pull tab 170 that extends beyond the trailing end 150 of the tape 20 (FIG. 7). The pull tab 170 allows users to more safely and conveniently unseal packages 10 by pulling on the pull tab 170 to pull the tape 20 off the package 10 (see FIG. 8B).

Numerous advantages are provided by the use of the pull cord 30 and pull tab 170: (1) because knives or other sharp objects are not needed to open packages 10, users experience fewer injuries, and personal injury/liability costs are reduced; (2) the ease of use and enhanced safety translate to a reduction in time spent for safety training; (3) the visibility of the pull cord 30 and the pull tab 170 can provide a visual indication of the condition and security of packages 10; (4) the ability to open packages 10 without box cutters or other sharp objects reduces damage to packages 10, and thus leads to a reduction in unsalables and reversed logistics; (5) the costs of box cutters and other types of box openers can be avoided; (6) not having to cut into packages 10 reduces cardboard dust, something of concern in food environments because of USDA regulations; (7) reduction in paperwork can be achieved because there are fewer returns resulting from damage to packages 10; (8) printing costs can be reduced by eliminating "Do Not Use Sharp Object To Open" signage on packages 10; (9) cardboard inserts for protecting packaged products from sharp objects that would otherwise be used to unseal packages 10 may not be necessary; (10) in a production environment, the enhanced ease of opening packages 10 can provide increased efficiencies; (11) use of varying pull cord 30 colors can help identify or categorize contents of a given package 10; (12) the pull cord 30 can assist in automated detection of packages 10 (and their contents) using cameras interfaced with object recognition technology.

Further advantages and features of the invention will be apparent from the remainder of this document in conjunction with the associated drawings.

DETAILED DESCRIPTION OF PREFERRED VERSIONS OF THE INVENTION

Figure 1:
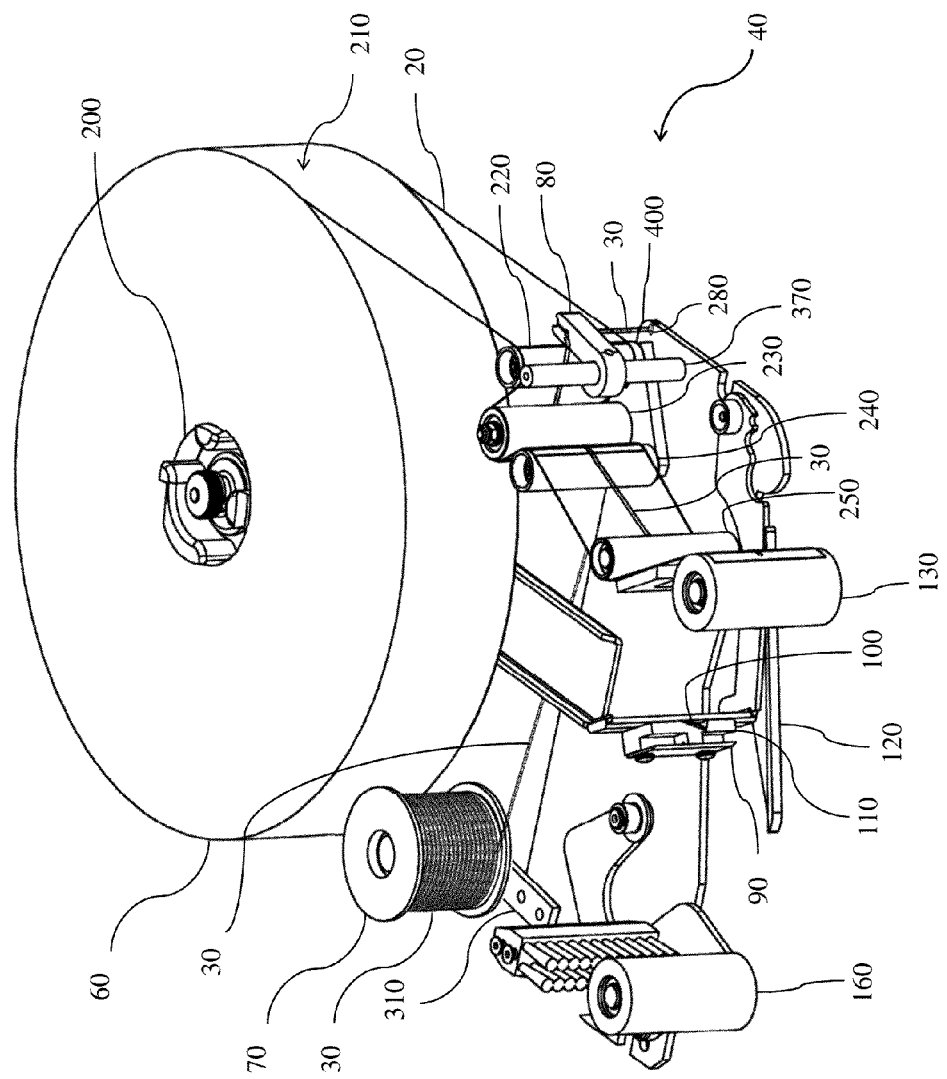
FIG. 1 shows an exemplary tape head 40 having a roll of tape 60, a pull cord spool 70, a collar guide 80, and a blade adapter 110.

A user may modify an already-available tape head, such as (for example) Intertape's HSD 2000 series of tape heads (or those of other manufacturers such as 3M or Loveshaw) to obtain the exemplary tape head 40 of FIG. 1. Such tape heads can be used with carton sealers having (for example) Uniform Semi-Automatic, Random Semi-Automatic, Uniform Automatic, or Random Automatic configurations made by such manufacturers as Loveshaw, Intertape, and 3M (see FIGS. 5A-5C). Referring to FIG. 6, the tape 20 from the replaceable roll of tape 60 (received by a tape mandrel or other tape roll holder 200) and the pull cord 30 from the replaceable pull cord spool 70 are initially separate, and the tape 20 and the pull cord 30 are adhered to each other before the tape 20 is applied to packages 10 being sealed. The tape 20, with its adhesive surface 210 facing out, travels past a first guide roller 220, a clutch roller 230, a second guide roller 240, and a third guide roller 250 before encountering a tape shoe 260 (FIG. 6) and the forward application roller 270. The pull cord 30 travels from the pull cord spool 70 and through a pull cord aperture 280, and is fed through a collar guide aperture 290. The pull cord 30 is adhered to the adhesive surface 210 of the tape 20 prior to beginning a carton sealing cycle represented (for example) by FIGS. 5A-5C.

Figures 4A, 4B, 4C:
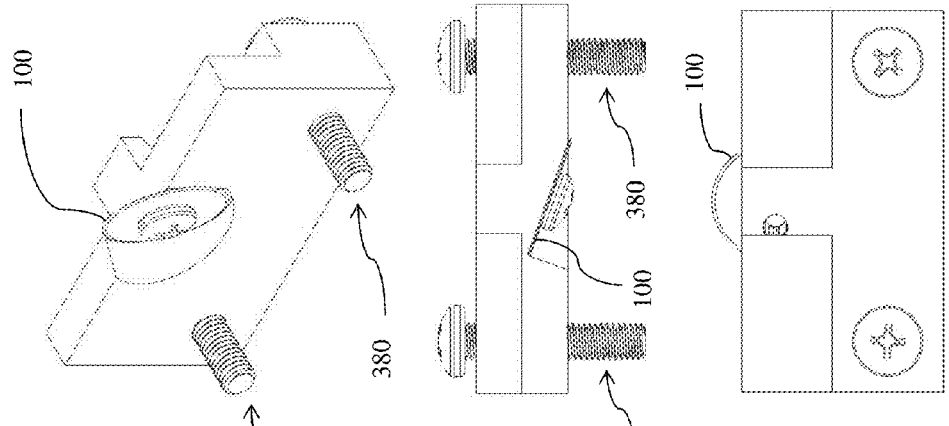
FIGS. 4A, 4B, and 4C are three different views of the blade adapter 110 that is secured to the tape head 40 of FIG. 1, shown with a pull cord blade 100 but without a tape blade 90.
Figures 2, 3:
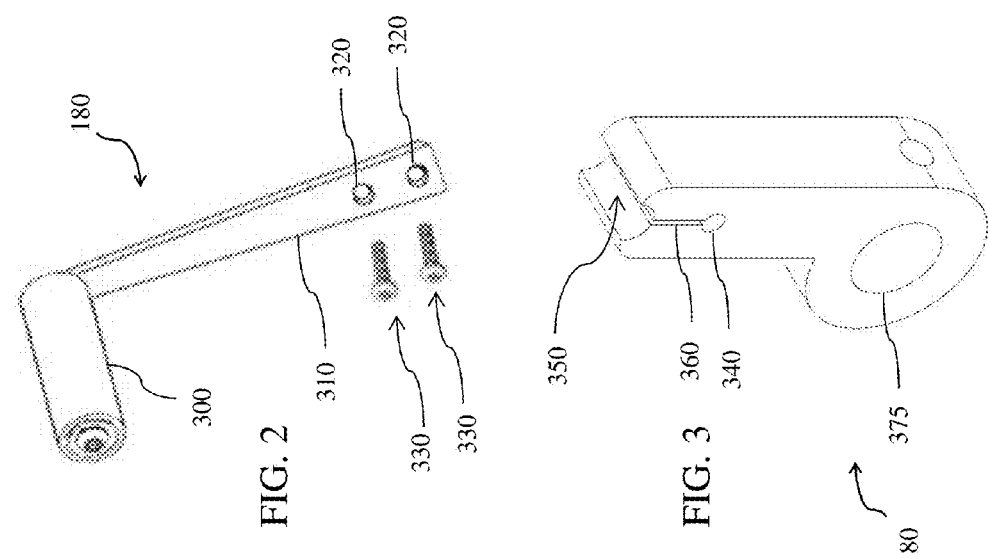
FIG. 2 shows the pull cord mandrel assembly 180 that is secured to the tape head 40 of FIG. 1.
FIG. 3 shows the collar guide 80 that is secured to the tape head 40 of FIG. 1.

Referring to FIG. 2, the pull cord spool 70 can be secured to the tape head 40 via a pull cord mandrel assembly 180 that serves as a spool holder. The mandrel assembly 180 includes a mandrel 300 extending from an assembly arm 310. The assembly arm 310 includes apertures 320 for receiving mandrel fasteners 330 used to secure the pull cord mandrel assembly 180 to the tape head 40. Referring to FIG. 3, a collar guide 80 includes a collar pull cord aperture 340 and a collar guide valley 350 at opposing ends of a collar guide slit 360. The collar pull cord aperture 340 receives the pull cord 30 past the collar guide valley 350 and through the collar guide slit 360. The collar guide 80 can be secured to the tape head 40 by passing the collar guide 80 over a collar guide mandrel 370 via the collar guide aperture mandrel 375 (FIG. 1). Referring to FIGS. 4A-4C, the blade adapter 110 includes the pull cord blade 100 and adapter fasteners 380 for securing the tape blade 90 to the blade adapter 110, and for securing the blade adapter 110 to the tape head 40. The angling of the pull cord blade 100 allows the pull cord blade 100 to more effectively cut into the pull cord 30.

The pull cord blade 100 is preferably circular as such a configuration is well-suited to cutting the pull cord 30, particularly in light of the velocity with which the cutting arm 120 tends to approach tape 20/pull cord 30. Such a pull cord blade 100 facilitates a cleaner cut for providing the pull tab 170, reducing "breaks" in the pull cord 30 and removal of chunks of tape 20 from the trailing end 150 of the tape 20. The blade is preferably set at a twenty-degree angle to the tape 20/tape head 40, providing a "blocked-out" area between the tape blade 90 and the pull cord blade 100. Without the blocked-out area, the pull cord blade 100 is more likely to take out a chunk of tape 20. When the pull cord 30 encounters the blade adapter 110, the pull cord 30 is sliced as the pull cord 30 in effect "slides" down one side of the pull cord blade 100. The angle of the pull cord blade 100 helps the blade adapter 110 leave the tape 20 relatively intact. The blocked-out area/gap facilitates the resulting length of pull tab 170.

Figures 5A, 5B, 5C:
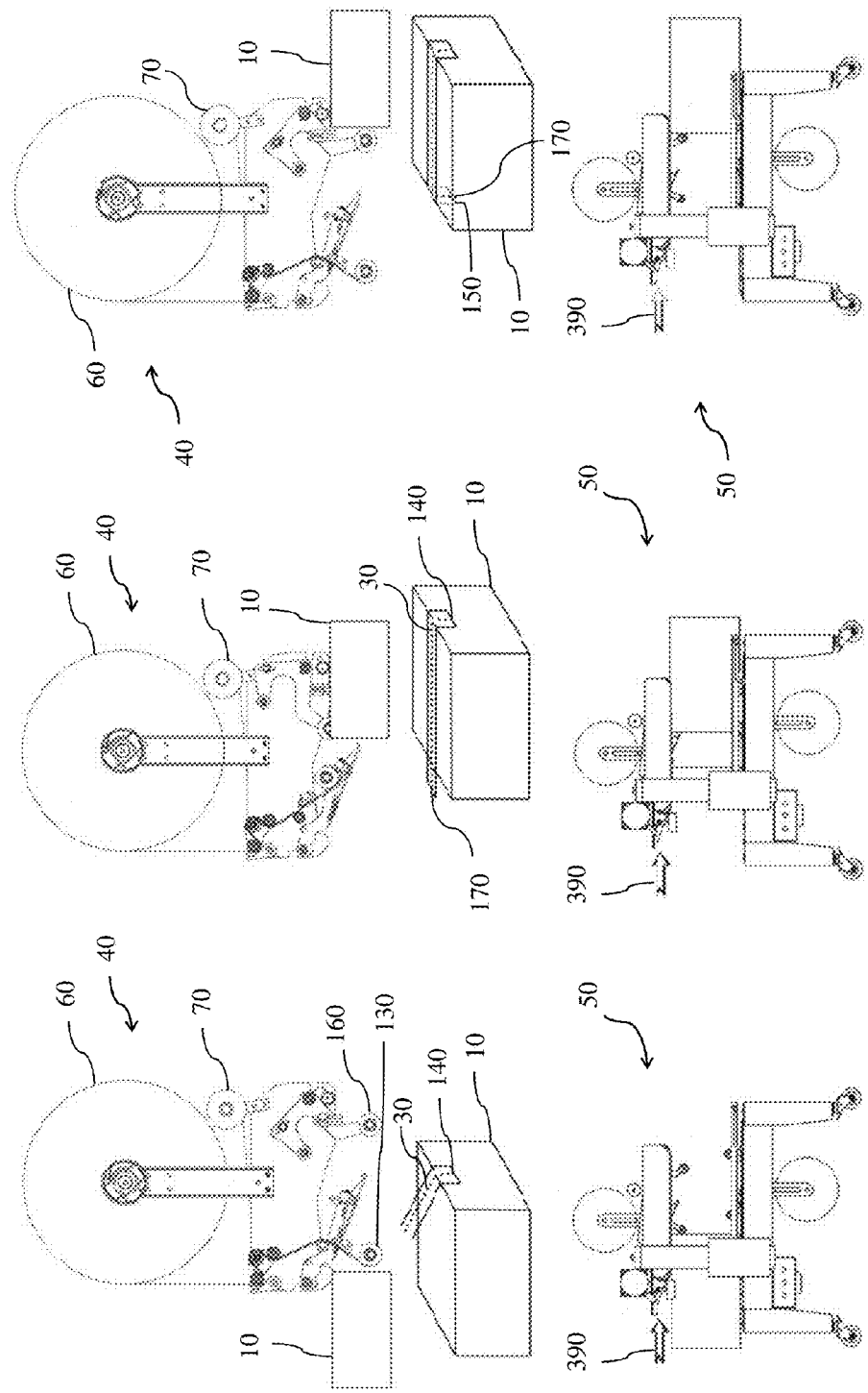
FIGS. 5A, 5B, and 5C show the process of sealing a package 10 with the tape head 40 of FIG. 1 installed in a carton sealer 50.
Figure 6:
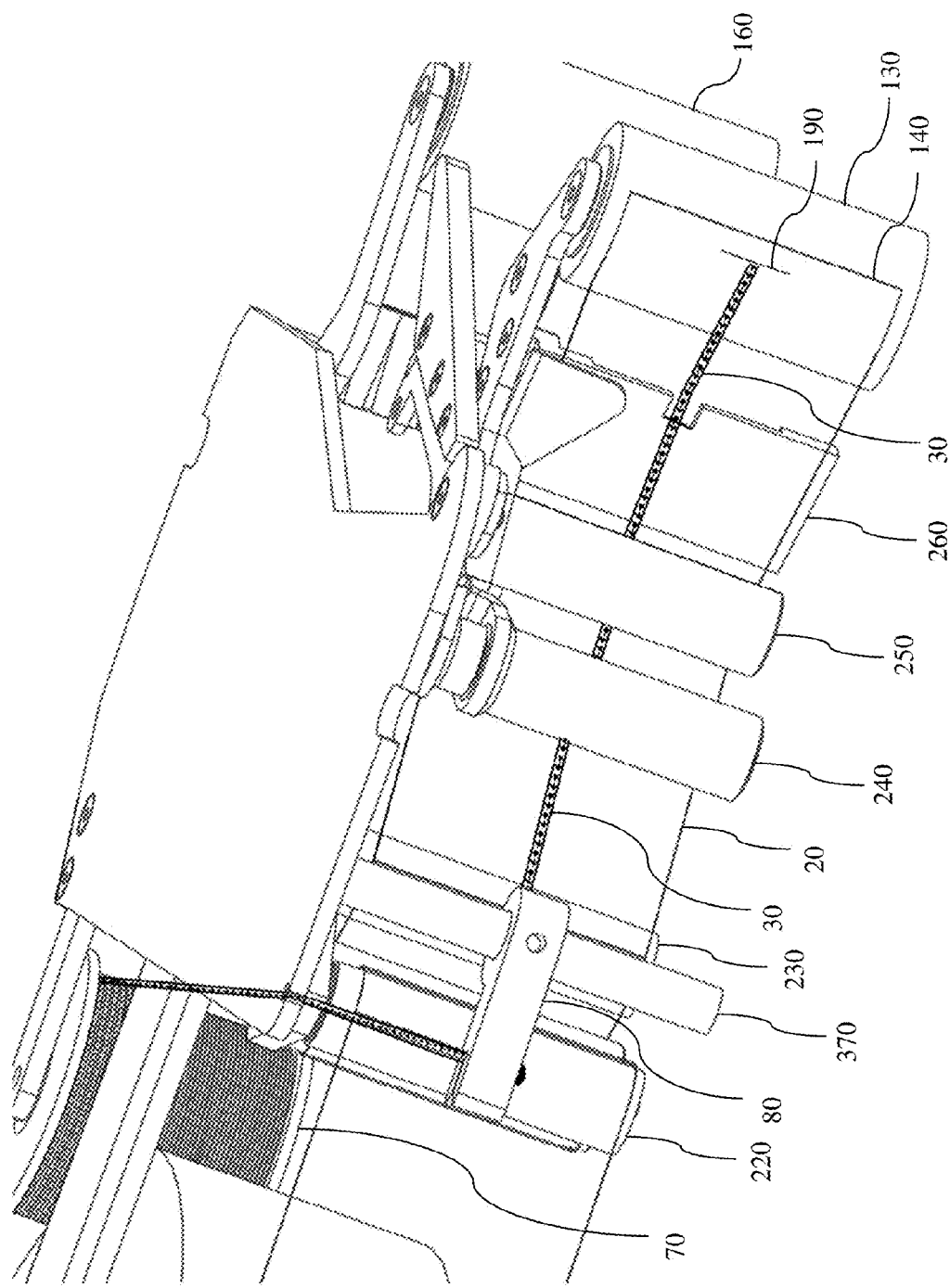
FIG. 6 is a close-up view of a portion of the tape head 40 of FIG. 1, showing a pull cord 30 extending from a pull cord spool 70, through a collar guide 80, to a slit 190 in the tape 20 that is positioned prior to the edge of the tape 20 at the leading end 140 of the tape 20.

Referring to FIG. 5A, a package 10 traveling in a direction of package flow 390 is pressed against the forward applying roller 130, causing the forward applying roller 130 to retract. The tape head 40 first applies the leading end 140 of adhesive tape 20 to the package 10, and the forward applying roller 130 presses the tape 20 against the package 10 being sealed as the tape 20 rolls off the tape roll 60. Referring to FIG. 5B, once the package 10 has cleared the forward applying roller 130, the cutting arm 120 swings such that the tape blade 90 and the pull cord blade 100 cut into and sever the tape 20 and pull cord 30 from the pull cord spool 70 and tape roll 60. Because the pull cord blade 100 extends out farther than the tape blade 90, the pull cord 30 is severed before the tape 20 is severed. The pull cord blade 100 cuts into the tape 20 to access and sever the pull cord 30, leaving a slit 190 at the leading end 140 of the tape 20 (FIG. 6). This leaves a pull tab 170 (having a length of about, for example, half an inch to three-quarters of an inch) extending beyond the trailing end 150 of the tape 20. Referring to FIG. 5C, the rear applying roller 160 presses against the trailing end 150 of the tape 20 to finish sealing the top of the package 10. The tape head 40 may leave about (for example) two inches of tape 20 ("legs" of tape 20) extending beyond the top of the package 10 at the leading and trailing ends 140, 150 of the tape 20.

A second tape head (that is inverted in FIGS. 5A-5C relative to the first tape head 40) can be used to allow the carton sealer 50 to seal the bottom of the package 10 with tape (not pictured) as the top of the package 10 is being sealed. If a pull cord 30 is desired (additionally or alternatively) on the bottom of the package 10 (for example, for identification purposes or to allow the package 10 to be openable from both the top and the bottom using a pull tab 170), a pull cord 30 may be incorporated into the inverted tape head 40 used to seal the bottoms of packages 10. If the pull cord 30 is desired on the bottom of the package 10 but the pull tab 170 is not desired (see FIG. 8A), the pull cord blade 100 would not be incorporated into the bottom tape head 40.

Figure 7:
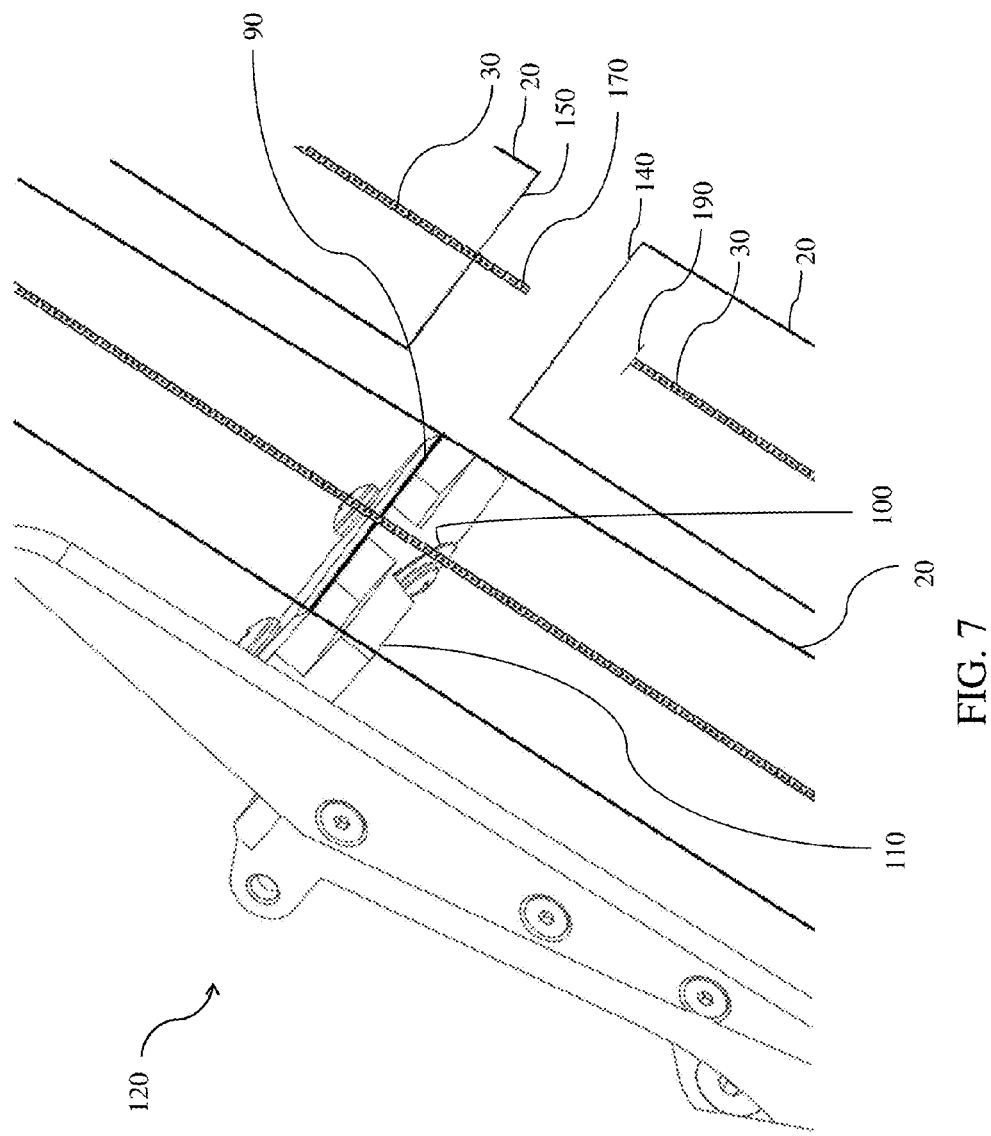
FIG. 7 is a close-up view of a cutting arm 120 of the tape head 40 of FIG. 1, showing the blade adapter 110 of FIG. 1. The tape 20 and pull cord 30 are shown as they appear prior to being severed by the cutting arm 120 and after they are severed, with the severed tape 20 having a slit 190 at a leading end 140 of the tape 20 and a pull tab 170 at a trailing end 150.

To open a sealed package 10, a user may begin by grasping the pull tab 170 protruding from beneath the trailing end 150 of the adhesive tape 20. The user may then pull on the pull cord 30 (for example, in a direction that is approximately perpendicular to the top surface of the package 10) to separate the tape 20 from the package 10 and unseal the sealed package 10. As represented in FIG. 7, the leading end 140 of the adhesive tape 20 does not include a pull tab 170. Instead, the pull cord 30 (and the slit 190) is displaced from the edge of the tape 20 at the leading end 140 by a length that is substantially equal to the length of the pull tab 170.

The pull cord 30 is preferably a four-ply cotton cord/string. Such a pull cord 30 provides appropriate surface area for the cord/string to adhere to the tape 20 (and travel therewith). Additionally, such a pull cord is capable of cutting the tape when being pulled to open a package 10 without slipping out from underneath the tape 20. Moreover, a four-ply cotton cord/string is suitable for being properly cut by the pull cord blade 100 to leave the pull tab 170 without the pull cord 30 folding under the tape 20. Further, cotton can be advantageous because it can be a relatively inexpensive material. However, other suitable materials that provide the desired results could also be used; in particular, equivalent cords having (for example) suitable surface area, dimensions, resilience, etc., could also be incorporated in the pull cord 30.

The tape 20 is preferably a pressure-sensitive adhesive tape, having (for example) a two-inch or three-inch width.

It should be understood that various terms referring to orientation and position are used throughout this document—for example, "top" (as in "top of the package")—are relative terms rather than absolute ones. In other words, it should be understood (for example) that the top of the sealed package may in fact be located at the bottom of the carton sealer depending on the overall orientation of the apparatus. Thus, such terms should be regarded as words of convenience, rather than limiting terms.

Also in the following description, it is to be understood that such terms as "forward," "rear," "left," "right," "upwardly," "downwardly," and the like are words of convenience and are not to be construed as limiting terms.

Various preferred versions of the invention are shown and described above to illustrate different possible features of the invention and the varying ways in which these features may be combined. Apart from combining the different features of the foregoing versions in varying ways, other modifications are also considered to be within the scope of the invention. Following is an exemplary list of such modifications.

First, although the above discussion revolves around the exemplary use of a tape head that fits into a tape head cavity of a case sealer, exemplary methods and systems may involve (for example) the use of a handheld tape applicator.

Second, although in the tape head of FIG. 1 the pull cord and the tape are joined from separate sources, the pull cord may alternatively be adhered to the tape in advance (e.g., by providing the pull cord as part of the tape roll).

Third, although in the above discussion the pull cord blade is added to a tape head via a blade adapter, the pull cord blade may (for example) alternatively be directly added to the cutting arm, or integrated (for example) with a replaceable cutting arm.

Fourth, although the pull cord aperture in FIG. 1 is integrated into a back plate 400 of the tape head, the tape head may alternatively or additionally be provided with (for example) a separate flange that is secured to the back plate via (for example) a fastener. The flange may have (for example) a slit and/or aperture for receiving the pull cord and supporting the pull cord on its path from the pull cord spool to (for example) the collar guide and/or to the adhesive surface of the tape.

Fifth, the blade adapter, pull cord mandrel assembly, collar guide, and/or pull cord spool can be reconfigured (by changing, for example, their relative dimensions, positions, materials, securing mechanisms, etc.) so as to fit the particular tape head being used.

Figure 8A:
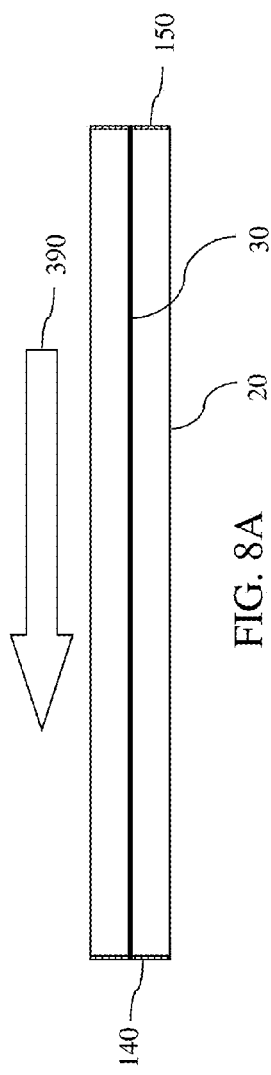
FIG. 8A represents the condition of the tape 20 and pull cord 30 resulting from the passage of a package 10 through a carton sealer 50 if an alternative tape head 40 that does not include a pull cord blade 100 is used.
Figure 8B:
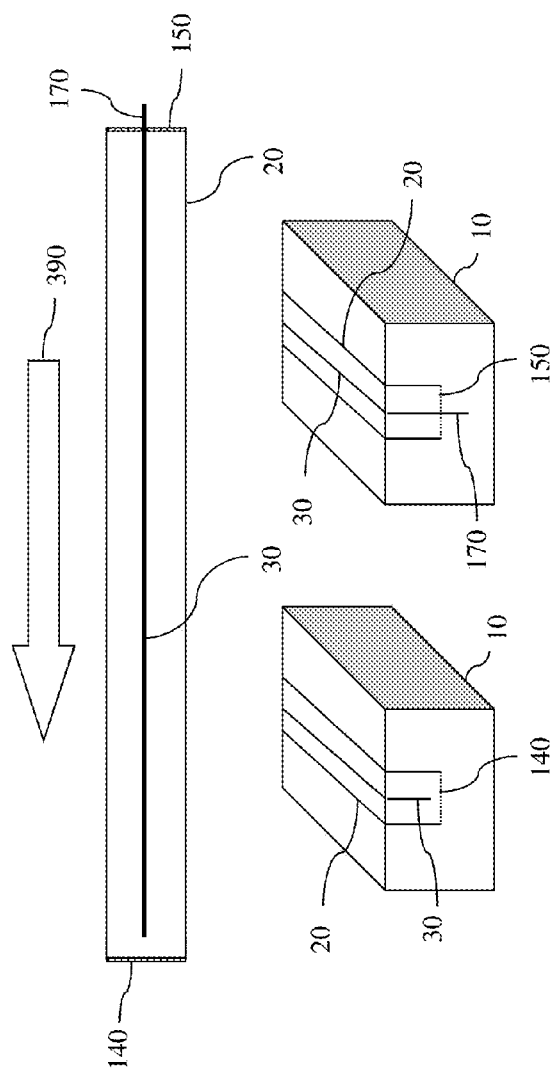
FIG. 8B represents the condition of the tape 20 and pull cord 30 resulting from the passage of a package 10 through a carton sealer 50 using the tape head 40 of FIG. 1, which includes a pull cord blade 100, and shows the appearance of a leading end 140 and a tape trailing end 150 of a sealed package 10.

Sixth, although the above configuration provides a pull tab to assist users in opening sealed packages, the pull cord blade may be eliminated (for example) so as to achieve a pull cord that extends the length of the tape but does not extend beyond the tape to provide a pull tab (see FIG. 8A). A pull cord without a pull tab could be applied (for example) to aid in identifying or categorizing packages.

The invention is not intended to be limited to the preferred versions of the invention described above, but rather is intended to be limited only by the claims set out below.

Thus, the invention encompasses all different versions that fall literally or equivalently within the scope of these claims.

What is claimed is:

1. A tape head for a carton sealer,
   a. the tape head including:
      i. a tape holder for receiving tape; and
      ii. a cutting arm having:
         1) a tape blade; and
         2) a pull cord blade separated from the tape blade;
   b. wherein when the tape head is received in a carton sealer to seal cartons using tape and a lengthwise pull cord, the cutting arm is configured to cut the tape as a carton moves past the tape head such that a portion of the pull cord extends beyond one end of the tape to form a pull tab, whereby a user may pull on the pull tab to separate the tape from the carton and unseal the carton without needing to cut the tape.

2. The tape head of claim 1 wherein the tape head further includes a pull cord holder for receiving a pull cord.

3. The tape head of claim 2 wherein when a carton moves through a carton sealer with the tape head, the pull cord blade severs a pull cord from the pull cord holder before the tape blade severs a tape from the tape holder.

4. The tape head of claim 2:
   a. further including:
      i. a roll of tape received in the tape holder; and
      ii. a spool of pull cord received in the pull cord holder;
   b. wherein the pull cord is adhered to the tape before the tape and the pull cord are cut.

5. The tape head of claim 1 wherein when the tape head is in a carton sealer, the tape is cut after pull cord is adhered thereto.

6. The tape head of claim 1 wherein:
   a. a leading end of the tape is secured to a carton moving past the tape head before a trailing end of the tape is secured to the carton, the trailing end opposing the leading end; and
   b. the pull cord extends beyond the trailing end of the tape to form the pull tab.

7. The tape head of claim 6 wherein the pull cord does not extend beyond the leading end of the tape sealing a carton such that there is no second pull tab at the leading end of the tape.

8. The tape head of claim 1 wherein the pull cord blade is angled with respect to the tape blade.

9. The tape head of claim 1 wherein the pull cord extends farther along a cutting direction than the tape blade.

10. The tape head of claim 1 wherein the tape extends widthwise from a tape first side to a tape second side, the tape head further including a collar guide configured to laterally position the pull cord between the tape first side and the tape second side.

11. The tape head of claim 1 wherein the cutting arm is movable between a cutting arm retracted position and a cutting arm extended position, the cutting arm being biased towards the cutting arm extended position.

12. The tape head of claim 11 wherein when the tape head is received in a carton sealer:
   a. the cutting arm is in a path of moving cartons when the cutting arm is in the cutting arm extended position; and
   b. the cutting arm is moved to the cutting arm retracted position by moving cartons.

13. The tape head of claim 12 wherein the tape head is configured such that the tape and the pull cord are cut by the tape blade and the pull cord blade after a moving carton has cleared a forward applying roller.

14. The tape head of claim 1 further including a retractable forward applying roller and a retractable rear applying roller, the forward and rear applying rollers being positioned on opposing sides of the cutting arm, wherein when the tape head is received in a carton sealer, the forward and rear applying rollers apply pressure to adhesive tape to seal cartons.

15. The tape head of claim 1 wherein:
 a. the cutting arm is:
  i. movable between a cutting arm retracted position and a cutting arm extended position, the cutting arm being biased towards the cutting arm extended position;
  ii. positioned between a retractable forward applying roller and a retractable rear applying roller:
 b. the tape head is configured to cut a pull cord and an adhesive tape after the cutting arm has started moving from the cutting arm retracted position towards the cutting arm extended position.

16. The tape head of claim 1 further including a collar guide configured to support a pull cord on a path from the pull cord holder to tape from the tape holder.

17. A tape head for a carton sealer,
 a. the tape head including a cutting arm having:
  i. a tape blade; and
  ii. a pull cord blade separate from the tape blade;
 b. wherein the tape head seals cartons with a tape and a pull cord by using the cutting arm to cut the tape and the pull cord as a carton moves past the tape head such that a portion of the pull cord extends beyond one end of the tape to form a pull tab, whereby a user may pull on the pull tab to separate the tape from the carton and unseal the carton without needing to cut the tape.

18. The tape head of claim 17 wherein when the tape head is received in a carton sealer, the tape head is configured such that as a carton moves through the carton sealer,
 a. pull cord is adhered lengthwise to the tape, and
 b. the pull cord blade severs pull cord before the tape blade severs the tape.

19. A method of using a tape head to seal cartons,
 a. the tape head including a cutting arm having:
  i. a tape blade; and
  ii. a pull cord blade separate from the tape blade;
 b. wherein the method includes the step of using the tape head to seal a carton with a tape and a pull cord by using the cutting arm to cut the tape and the pull cord as a carton moves past the tape head such that a portion of the pull cord extends beyond one end of the tape to form a pull tab, whereby a user may pull on the pull tab to separate the tape from the carton and unseal the carton without needing to cut the tape.

20. The method of claim 19 wherein:
 a. the tape head further includes:
  i. a tape holder for receiving tape;
  ii. a pull cord holder for receiving pull cord;
 b. the method further includes the steps of:
  i. securing a roll of tape to the tape holder;
  ii. securing a spool of pull cord to the pull cord holder; and
  iii. installing the tape head in a carton sealer to seal the carton with tape and pull cord, wherein the pull cord blade is used to sever pull cord before the tape blade is used to sever tape.

\* \* \* \* \*